United States Patent [19]

Lempicki

[11] Patent Number: 4,797,889
[45] Date of Patent: Jan. 10, 1989

[54] SOLID STATE MOLECULAR LASER

[75] Inventor: Alexander Lempicki, Boston, Mass.

[73] Assignee: Boston University, Boston, Mass.

[21] Appl. No.: 65,844

[22] Filed: Jun. 24, 1987

[51] Int. Cl.$^4$ .................... H01S 3/16; H01S 3/17
[52] U.S. Cl. ...................... 372/39; 372/40; 372/41; 372/57; 372/68
[58] Field of Search .............. 372/34, 40, 41, 42, 372/57, 68

[56] References Cited

U.S. PATENT DOCUMENTS

| | | | |
|---|---|---|---|
| 3,504,300 | 3/1970 | Mazelsky et al. | 372/68 |
| 3,621,340 | 11/1971 | Singh et al. | 372/68 |
| 3,681,102 | 8/1972 | Beall | 252/301.6 F |
| 3,788,865 | 1/1974 | Babcock et al. | 501/7 |
| 3,999,145 | 12/1976 | Gilman et al. | 372/68 |
| 4,229,713 | 10/1980 | McCollum et al. | 372/41 |
| 4,244,723 | 1/1981 | Grossman | 65/114 |
| 4,272,733 | 6/1981 | Walling et al. | 372/20 |
| 4,284,962 | 8/1981 | Esterowitz et al. | 372/41 |
| 4,371,965 | 2/1983 | Lempicki et al. | 372/46 |
| 4,464,761 | 8/1984 | Alfano et al. | 372/41 |
| 4,627,064 | 12/1986 | Auzel et al. | 372/41 |
| 4,648,094 | 3/1987 | McCollum et al. | 372/68 |
| 4,679,198 | 7/1987 | Shone et al. | 372/41 |

OTHER PUBLICATIONS

Torardi, Brixner, & Blasse, *Structure and Luminescence of $K_2TaF_7$ and $K_2NbF_7$ Journal of Solid State Chemistry* 67, 21–25 (1987).
"Tunable Single Pass Gain in Titanium-Activated Lithium Germanium Oxide," by Loiacono, Shone & Mizell *Appl. Phy. Lett.* 48:622 1986.
Topical Meeting on Tunable Solid State Lasers Technical Digest (Summaries of papers presented at meeting of Jun. 4–6, 1986), conference edition.
The Luminescence of Closed-Shell Transition-Metal Complexes George Blasse, *Structure & Bonding*, vol. 42, 1980.
*Philips Technical. Review*, vol. 31, 1970, No. 10.
*Prospects for Some New Dielectric Solid State Lasers* William Krupke and Marvin Weber, Tunable Solid State Lasers Conf. Williamsburg, VA 10/26/87.
*Luminescence of Calcium Tungstate Crystals*, Treadway & Powell Department of Physics, Oklahoma State Univ., May 20, 1974.
Temperature Dependent Luminescence of $CaWo_4$ and $CdWo_4$*, Beard, Kelly & Mallory *Journal of Applied Physics*, vol. 33, No. 1.
"Some Considerations and Experiments on Concentration Quenching Characteristic Broad-Band Fluorescence", G. Blasse, Phillips Res. Repts. 23, 344–361, 1968.
"Luminescence Phenomena in Compounds with Fergusonite Structure" Blasse, & Bril, *Journal of Luminescence* 3 (1970) 109–131.
"Luminescence and Energy Transfer in the Ordered Perovskite System $La_2MgSn_{1-x}Ti_xO_6$" by A. J. H. Macke Physical Laboratory, Solid State Department, State University of Utrecht.

*Primary Examiner*—William L. Sikes
*Assistant Examiner*—Xuan T. Vo
*Attorney, Agent, or Firm*—Hamilton, Brook, Smith & Reynolds

[57] ABSTRACT

A solid state laser in which molecules containing transition metal ions form the lasing medium. More particularly, the electronic states of molecular complexes containing transition metal ions, which are in closed shell configurations, are pumped by an ultraviolet source to emit coherent radiation.

20 Claims, 1 Drawing Sheet

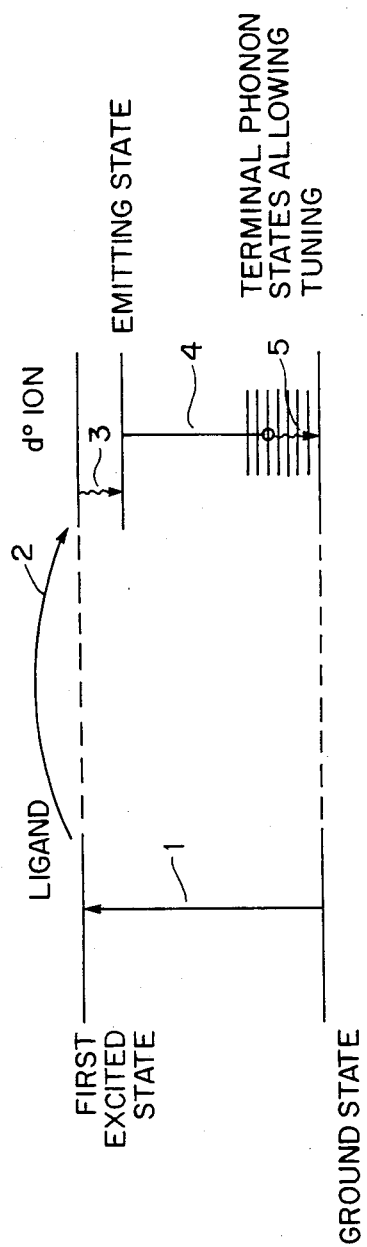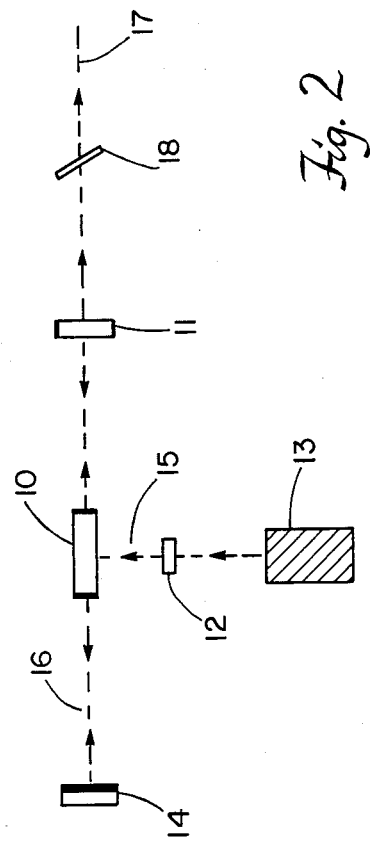

SOLID STATE MOLECULAR LASER

BACKGROUND OF THE INVENTION

Laser materials depend on their ability to absorb energy in such a way that more atoms (or molecules) are excited into a higher energy level than are in the terminal state, rendering the material capable of "stimulated" emission. If light of the appropriate wavelength is incident on such an excited material, it will stimulate emission of additional light having the same wavelength, phase, and direction as the incident light. This additional light, by augmenting the intensity of the incident light, demonstrates light amplification. Laser action was first demonstrated in 1960 using ruby ($Al_2O_3$:$Cr^{3+}$), a crystalline solid system. Since then, laser action has been achieved in crystalline solid, gas, and liquid systems.

Some lasers are wavelength tunable, although most can be tuned only over a bandwidth of less than a nanometer. Broadly wavelength-tunable lasers are extremely useful in scientific and industrial applications, e.g., isotope separation, but have been primarily restricted to the liquid medium dye lasers. There exists, however, a category of broadly tunable solid-state lasers referred to as "phonon-terminated" or "vibronic" lasers. Typical examples are $BeAl_2O_4$:$Cr^{3+}$, (alexandrite), and $Al_2O_3$:$T_i^{3+}$. In the first case, there are three electrons in the d shell of the transition metal ion ($Cr^{3+}$) and in the second only one. The first example is disclosed in U.S. Pat. No. 4,272,733, a typical chromium ion doped tunable laser. Another trivalent chromium ion doped laser is disclosed in U.S. Pat. No. 4,464,761. A list of $Cr^{3+}$ doped lasers is available in J. A. Craid, "Tunable Solid State Lasers II" Ed. A. B. Budgor, L. Esterowitz and L. G. DeShazer Springer, N.Y., 1986. The excited ground state of the dopant ions provide the source of coherent radiation. In either case, the tunability is due to a broad emission band resulting from a coupling of the electronic excited state to the lattice.

Another example of tunable laser is based on color centers where an electron trapped at a defect couples to the lattice and produces a broad emission band. But the most common variety of tunable laser is the so-called dye laser which utilizes dye molecules in a liquid medium. In this case, the electronic state of the entire molecule provides the levels between which the luminescent (and laser) transitions take place.

Liquid dye lasers, have several shortcomings. They are generally limited in average power capabilities because of thermal instability of their liquid host. That instability also necessitates, auxiliary equipment to maintain dye flow for high power operation. Their performance is limited by decomposition of the organic dye material. Some of the dyes and solvents are toxic and/or corrosive. In addition, because of their limited energy storage, the dye lasers cannot be Q-switched.

SUMMARY OF THE INVENTION

The present invention is comprised of a solid state laser which utilizes molecular ions as the lasing medium. The inter-ionic electronic states of these molecular ions when excited by ultraviolet light emit radiation which leads to laser action in a resonant cavity. These molecules contain ions in closed shell configurations i.e., no electrons in the d shell. These lasers are tunable over a broad range, generally emitting in the blue-green region of the spectrum.

The molecular ions may be contained within a single crystal of one of the compounds, or a mixed single crystal of two or more of the compounds. The molecular ions may also be contained within the matrix of a glass or glass ceramic. These molecular ions are either the oxides or halides or oxyhalides of $Ti^{+4}$, $Zr^{+4}$, $Hf^{+4}$, $V^{+5}$, $Nb^{+5}$, $Ta^{+5}$, $Cr^{+6}$, $Mo^{+6}$, $W^{+6}$, and $Mn^{+7}$.

BRIEF DESCRIPTION OF THE DRAWINGS

FIG. 1 is a schematic view of an energy level diagram showing the laser transition of the present invention.

FIG. 2 is a schematic illustration of a solid state laser using the solid state molecular lasing medium of the present invention.

DETAILED DESCRIPTION OF THE INVENTION

Unlike doped crystalline lasers, which depend upon the existence of electronic states of an ion, the present invention provides a molecular entity in a solid host. It is the molecular states of this entity which provide the levels between which the lasing transitions take place. FIG. 1 schematically illustrates the energy levels associated with the present invention. Electrons within the lasing medium are excited 1 from the ground state by an external energy source. The next step is an absorption process usually referred to as a charge transfer 2. It results in a redistribution of charge from the ligand to the closed shell (d) transition metal ion. The system may then relax 3 to an emitting state with the emission of a phonon. The next step is photon emission 4 and a transition to any one of the vibrationally excited ground states. The final step is phonon 5, emission, which restores the original state of the system. The emitting species suitable for this laser action are provided by closed shell transition metal ions, i.e., ions which have no electrons in the d shell and are thus in their highest oxidation states. Suitable ions are listed in Table 1.

TABLE 1

| | Closed Shell Transition Metal Ions | | | |
|---|---|---|---|---|
| valence | +4 | +5 | +6 | +7 |
| 3d | Ti | V | Cr | Mn |
| 4d | Zr | Nb | Mo | |
| 5d | Hf | Ta | W | |

Molecular entities result when these ions form complexes with oxygen or fluorine resulting in oxides and/or fluorides. The oxygen complexes of the present invention are listed in Table 2.

TABLE 2

| Complexes of d° Transition Metal Ions | | |
|---|---|---|
| valance | ion complex | |
| +4 | $TiO_4^{4-}$ | Titanate |
| | $TiO_5^{6-}$ | Titanate |
| | $TiO_6^{8-}$ | Titanate |
| | $ZrO_6^{8-}$ | Zirconate |
| | $HfO_6^{8-}$ | Hafneate |
| +5 | $VO_4^{3-}$ | Vanadate |
| | $NbO_4^{3-}$ | Niobate |
| | $NbO_6^{7-}$ | Niobate |
| | $TaO_4^{3-}$ | Tantalate |
| | $TaO_6^{7-}$ | Tantalate |
| | $TaO_3^{1-}$ | Tantalate |
| +6 | $CrO_4^{2-}$ | Chromate |
| | $MoO_4^{2-}$ | Molybdate |
| | $MoO_6^{4-}$ | Molybdate |

TABLE 2-continued

| Complexes of d° Transition Metal Ions | | |
|---|---|---|
| valance | ion | complex |
| | $WO_4^{2-}$ | Tungstate |
| | $WO_6^{6-}$ | Tungstate |
| +7 | $MnO_4^-$ | Manganate |

The absorption bands of these complexes lie usually in the ultraviolet (200–400 nm) and are often referred to as charge transfer bands. The reason for this nomenclature is that it describes the process of absorption as resulting in a transfer of charge from the ligands to the central metal ion. An important aspect of the electronic structure of these molecular ions is that the ground state is a singlet state (all spins of the electrons are paired), whereas the excited states, from which emission (and hence laser action) can occur, are either singlets or triplets.

In liquid dye lasers, which also use intramolecular transitions, the emitting excited states are singlets which accounts for their short decay time (nanoseconds). This limits the energy storage of dye lasers and precludes Q-switching. In the molecular complexes of this invention, the decay times are typically 100-1000 times longer (microseconds), which has two important consequences for laser action: it makes it easier to pump by using flash lamps, which have typical pulse durations greater than 1 microsecond and increases the energy storage capability compared to dyes in the ratio of decay times. These, apart from being solid, are the additional advantages of this invention over dyes.

Another aspect of this invention which distinguishes it from other approaches to broadly tunable lasers is that the principal emission region of the molecular complexes lies in the blue-green region of the spectrum. The vibronic lasers operate typically in the red and near infrared. Some dyes provide emissions in the blue region but are typically less stable and efficient than dyes emitting in the green and yellow.

The active lasing medium includes compounds of the following anions: titanate, zirconate, hafneate, vanadate, niobate, tantalate, chromate, molybdate, tungstate, and manganate. The cations of these compounds can be chosen from but are not limited to the alkali (Li, Na, K, Rb, Cs) and alkali earth metals (Mg, Ca, Sr, and Ba). They may also come from the divalent cations Zn, Cd, and Pb, or the trivalent ions such as Y, Sc and La, or quatrovalent ions such as Sn.

The oxide complexes described above have as their most common and stable structure either a tetrahedrel or octahedral coordination. However, some departures are known. The square pyramidal structure of $Ti^{6-}{}_5$ in which titanium is coordinated to five oxygens is an example.

In addition to the oxides shown in Table 2, the transition metals in their high oxydation states can form complexes with halides (F, Cl, Br). The simplest compounds are limited to complexes of the quatrovalent ions $Ti^{4+}$, $Zr^{4+}$, and $Hf^{4+}$. Typical examples are crystals of perovskite structure $A^{2+}{}_2$, $M^{4+}$, $B^-{}_6$, where A is a monovalent ion such as Cs, and where M is one of the quatrovalent transition metals mentioned above and B=F, Cl or Br.

Another variant is a complex with mixed anions around the central transition metal cation. Examples are oxyhalides in which one or more of the halogens is replaced by an oxygen. Materials of this category may have the $[K_2 Pt Cl_6]$ structure (See J. F. Ackerman Mat. Res. Bull 19, 783, (1984)). An example of an oxychloride is $Cs_2 Ta OCl_5$ or $Cs_2 WO_2 Cl_4$.

Still different are complexes which include a transition metal ion in its highest oxydation state but not necessarily quatrovalent ($Nb^{+5}$) and all-halogen ligands. Complexes of that kind may have quite complicated structures. An example is $K_2NbF_7$ in which the pentavalent niobium has seven fluorine ligands (See C. C. Torardi et al. J. Sol. State Chem. 67, 21(1987)).

Examples of d. ions, coordinated to a Variety of ligands are therefore numerous. All of them by virtue of their closed shell configuration of the transition metal ion are subjects of this invention.

The active lasing medium of the present invention may be a single crystal of one of the above-mentioned compounds or a single crystal of a mixture of two-or more of the above-described compounds. Crystals of sufficient size and purity may be manufactured by a number of well known methods. Czochralaki's method is suitable for large crystal growth for example. Anhydrous oxides such as MO(M=Ca, Sr, Pb . . . ) and $M_n{'}O_m$(M'=transition metal of Table 1) can be mixed and melted together to obtain a suitable crystal. For a review of crystal growth methods see J. J. Rubin and R. A. Thomas; J. Am. Cer. Soc. 48,100 (1965). The crystal oxides referenced above are stable chemically, and have thermal and mechanical properties well suited for laser application.

Crystals of two compounds may be mixed to provide a suitable laser material. For example, vanadate crystals may be grown from a $Na_4V_2O_7$ flux and phosphate crystals may be grown from a $Na_4P_2O_7$ flux. By mixing these two fluxing agents a mixed vanadate-phosphate crystal may be grown.

The charge transfer bands situated in the near ultraviolet are the main pumping bands in the present laser. Calcium Tungstate $CaWO_4$ is a single crystal which exhibits ultraviolet excitation. Especially effective as a pumping source for this crystal is an excimer laser, as well or other sources of ultraviolet radiation. There are a variety of arrangements for using one laser to pump another which are all well known in the art. Using an excimer laser as the pumping source in the ultraviolet, one can use four wavelengths:

193 nm (ArF)
248 nm (KrF)
308 nm (XeCl), and
351 nm (XeF).

Normally, one chooses the longest pumping wavelength compatible with the material absorption so as to minimize heat generation resulting from down conversion of pump photons into laser photons.

In calcium tungstate, $CaWO_4$, for example, the absorption is approximately 2 cm$^{-1}$ at 308 nm. Hence, in a single crystal 0.5 cm long about 60% of the pumping radiation is absorbed. This indicates a longitudinal pumping geometry (for shorter pumping wavelengths the absorption is much higher and a transverse geometry may better because of the small penetration depth).

The relevant parameters for longitudinal pumping geometry for calcium tungstate are listed below.

| | |
|---|---|
| Pumping wavelength | 308 nm |
| Absorption constant (at 308 nm) | 2 cm$^{-1}$ |
| Emission wavelength | 450 nm |
| Emission bandwidth | 100 nm |
| Emission crossection | 5 × 10$^{-20}$ cm$^2$ |

| -continued | |
|---|---|
| Lifetime (radiative) | $7 \times 10^{-6}$ sec |
| Concentration of ions | $2.25 \times 10^{22}$ cm$^{-3}$ |
| Total cavity loss per pass, R | 3 percent |
| Inversion, $n_c$ | $1.3 \times 10^{18}$ cm |
| Absorbed energy (at threshold) $E_{abs}$ | 1 J/cm$^3$ |
| Mode volume V | 0.05 cm$^3$ |
| Pumping beam diameter | 0.1 cm |
| Refractive index n | 1.5 |
| Cavity (crystal) length $L_c$ | 0.5 cm |
| Planck constant | h |

The calculations are based on the following formulas:

$$\sigma_e = \frac{1}{4\pi^2 c \tau \nu \Delta\nu'} \quad \nu = \frac{c}{\lambda}$$

$$n_c = \frac{1-R}{L_c \sigma_e}$$

$$E_{abs} = \frac{V n_c hc}{n\lambda_p}$$

$$E_{th} = \frac{E_{abs}}{1 - \exp[-\alpha L_c]} \approx 4mJ$$

The threshold energy $E_{th}$ of a few millijoules is at least an order of magnitude smaller than the output of a small excimer laser.

The active lasing mediums of the present invention may also be contained within a glass or glass-ceramic matrix.

Materials which can be used to produce glass lasing media of the present invention containing the oxide of either Ti, Zr, Hf, Nb, Ta, Cr, Mo, or Mn are illustrated by Examples 1 and 2.

EXAMPLE 1

Materials

Tetralthylorthosilicate Si(OC$_2$H$_5$)$_4$
Water
Ethanol
Titanium tetrarsopropoxide Ti(OC$_3$H$_7$)$_4$
SiO - TiO$_2$ glasses made by the following process. Tetraethylorthosilicate Si(OC$_2$H$_5$)$_4$ was hydrolyzed with an excess of H$_2$O having a molar ratio of Si (OC$_2$H$_5$)$_4$:-H$_2$O of 1:4–12 ethanol under acidic conditions, pH=2 to 4. Ethanol, which was partly a product of the hydrolysis was removed by vacuum distillation to 10–50% of original volume. This was done to reduce the amount of liquid present and to reduce the final shrinkage of the gel.

Titanium tetraisopropoxide Ti (OC$_3$H$_7$)$_4$ is a solvent was added to the solution while stirring, hydrolyzing the Ti(OC$_3$H$_7$)$_4$ and reacting it with the Si(OH)$_4$ to form Si-O-Ti bonds. The resultant clear solution was then cast into polypropylene test tubes sealing them with paraffin film and maintaining at 40°–60° C. for one to five days until gelation took place. The time required for gelation depended on the pH, dilution and temperature.

The gels were air-dried slowly from 1 week to 4 months at room temperature to 40° C. after which they were removed from the test tubes. The dried gels were then slowly heated to 90° C. and held at that temperature for one day. The gels were then heated to 1000° C. for 6 hrs in flowing oxygen to remove any organic matter and water and to sinter the gels to complete density.

The glasses produced contained 0 to 10 mole % of TiO$_2$. Analysis of the glasses indicated that no TiO$_2$ was lost during processing.

EXAMPLE 2

Materials

WO$_3$
CaCO$_3$
Phosphoric Acid

WO$_3$-P$_2$O$_5$ (-CaO) glass was made in 10 to 20 gram batches according to the following process.

WO$_3$ and CaCO$_3$ were mixe together in an alumina crucible from 80° C. to 100° C., and stirred until the mixture becomes very viscous. The crucible was transferred to a furnace and heated to 750° C. over a period of four hours and held at that temperature for four more hours. The crucible was then covered and heated to a temperature of from 900° C. to 1000° C. until the glass was free of bubbles. The molten glass was then poured into either a stainless steel or graphite mold which had been pre-heated to 150°–400° C. The molten glass was then cooled to room temperature at a rate not to exceed 2° C./min.

Using processes similar to the processes of Examples 1 and 2, glasses containing the oxides of Zr, Sn, V, Mn, Nb, Mo, Hf, and Cr and Ta can be made and used as a solid state molecular lasing medium.

Also used as solid state molecules lasing medium according to the present invention, are glass ceramics containing agents as nucleating the oxides of Ti, Zr, V, Mn, Nb, Mo, W, Cr and Ta within the matrix of the glass ceramics. The glass ceramics used as lasing media of the present invention can be produced by using the process described by Babcock et.al., in U.S. Pat. No. 3,788,865 the teaching of which are hereby incorpoated by reference. A large number of glass ceramics have the following essential components in the following weight percentage limits, based on the total glass composition:

TABLE 3

| | Weight Percent |
|---|---|
| SiO$_2$ | 50–75 |
| Al$_2$O$_3$ | 16–35 |
| Li$_2$O | 3–5.5 |
| Nucleating agent | Variable |
| (Li$_2$O + nucleating agent) | At least 5.5) |

The nucleating agent used in the glass ceramics for lasing medium are selected from the group consisting of the oxides of Ti, Zr, Hf, V, Nb, Ta, Cr, Mo, W and Mn. The use of the oxides of Hf, Nb, Ta, Mo, and Mn as nucleating agent are considered novel. The particular amount of nucleating agent cannot be defined with precision, as it depends on the particular composition, the particular nucleating agent or combination of nucleating agents, etc. However, the range is about 0.1–10 weight percent of the composition. Many such glass compositions of the foregoing table can be thermally in-situ crystallized to obtain opaque glass-ceramics with large crystals. However, it has been found to be necessary to have present a "nucleating agent," hereinafter defined, in order to obtain small enough crystals so that the resulting ceramic is transparent. Therefore, the amount of nucleating agent necessary is that amount which will yield a thermally in situ crystallized product having substantially all of its crystals of a size less than ⅛ micron in diameter. As will be seen later, this size is preferably less than ¼ micron and is ideally less than about 0.1 micron.

Summarizing, most useful compositions to make the colored transparent ceramics of this invention contain the following components, in the following weight percentage limits, based on the total composition.

TABLE 4

| | |
|---|---|
| $SiO_2$ | 50–75 |
| $Al_2O_3$ | 16–35 |
| $Li_2O$ | 3–5.5 |
| $B_2O_3$ | 0–9 |
| $ZrO_2$ | 0–5 |
| $TiO_2$ | 0–10 |
| $SnO_2$ | 0–5 |
| $P_2O_5$ | 0–3 |
| $Na_2O$ | 0–2 |
| $ZnO$ | 0–4 |
| Alkaline earth oxides | 0–4.5 |
| ($ZrO_2 + TiO_2 + SnO_2$) | Not over 10 |
| ($SiO_2 + Al_2O_3$) | 75–92 | where the glass and ceramic compositions contain 94 to 100 weight percent of the components named in Table II, the other 6 to zero weight percent being other compatible inorganic ingredients, usually oxides or sulfides. "Nucleating agents" are materials which have the effect in the glass, when properly heat treated, of causing the formation of larger numbers of homogeneously dispersed crystals in the glass than in their absence. It appears probable that the glasses used in the present invention first form a microscopic or sub-microscopic dispersed crystalline phase, and that this dispersed phase initiates the formation of the main crystalline species, in some manner enabling the major crystalline species to crystallize substantially homogeneously throughout the mass of glass being heat treated, and helping to limit the maximum size of the crystals by providing many sites for crystal initiation.

In making the transparent in-situ crystallized glass-ceramics of the present aspect of the invention or the transparent glass-ceramics of the aspect of the invention later described, one first selects and melts a suitable glass composition containing sufficient nucleant to produce a transparent low expansion glass-ceramic on in-situ thermal crystallization. The glass is formed into any desired shape and then heat treated for crystallization to obtain the transparent ceramic. The optimum heat treatment depends, as will be understood, on the particular glass composition, the ratio of its ingredients and the type and amount of its nucleants, as well as the final properties desired. Therefore, it is not possible to specify a heat treatment schedule that will be common to all of the glass of the invention. However, it is usually preferred that the first heat treatment step be a relatively low temperature treatment that is in the region of maximum or high rate of nuclei or crystallite formation, wherein "nuclei" are defined as submicroscopic precursors of crystalline species or as a finely dispersed submicroscopic imiscible glassy phase. It is difficult to measure directly the area or range of temperatures in which the maximum rates of nuclei formation occurs, or in other words where the optimum temperatures for the initial heat treatment is to be located. However, this temperature usually lies in the range from 30° F. below the annealing point of the glass to 250° F. above the annealing point of the glass.

In most instances to make a transparent glass-ceramic the glass is heated within the foregoing initial temperature range, usually for least an hour or more. It is then heated at higher temperatures to complete crystallization to the desired degree, at least until the linear coefficient of thermal expansion is at least as low as $12 \times 10^{-7}$. The maximum temperature for this last treatment step is usually not more than 350° F. above the annealing point temperature, although higher temperatures can be employed so long as the glass-ceramics remains transparent, with substantially all of the crystals therein having a diameter less than ⅛ micron. Times vary from substantially zero at the maximum temperature employed (simply heating to a higher temperature and then cooling) to many hours of even days It will be understood that, for a given degree of crystallization times generally vary inversely with temperature.

While a second or higher temperature is often employed after the initial nucleating heat treatment step, it is usually possible to complete the crystallization to form the transparent, low expansion glass-ceramic by effecting the entire heat treatment at the same low temperature as the initial or nucleating heat treatment temperature, or even at a lower temperature so long as this is not more than 30° F. below the annealing point. Naturally, the heat treatment at such low temperatures will take longer time than if the temperature were raised for the final crystallization. Total heat treatment times in this embodiment can be as short as ½ hour or as long as many weeks. Such low temperature "isothermal" heat treatments tend to give a product having thick sections with more uniform coefficients of thermal expansion throughout the cross-section of the article. Also, such products tend to be more highly transparent and to have a smaller crystal size.

In a typical example of the invention, the following batch materials are melted at a glass temperature of about 2900° F. for about 72 hours in a gas-fired refractory furnace using a slight excess of air for an oxidizing atmosphere. The composition is shown below with the composition in parts by weight:

| | | |
|---|---|---|
| Petalite[1] | $SiO_2$ | 63.5 |
| | $Al_2O_3$ | 20.6 |
| Zircon sand | $Li_2O$ | 3.9 |
| Alcoa alumina[2] | CaO | 2.7 |
| Boric acid[3] | ZnO | 1.3 |
| High calcium lime | $B_2O_3$ | 3.4 |
| Lithium carbonate | $TiO_2$ | 1.8 |
| Titanox[4] | | |
| Black nickel oxide | CoO | 0.05 |
| Arsenic oxide ($As_2O_3$) | | |
| Niter | $Na_2O$ | 0.4 |
| | $As_2O_3$ | |

[1] 4.2% $Li_2O$, 16.1% $Al_2O_3$, 77.7% $SiO_2$, 0.4% $Na_2O$, 0.2% $K_2O$, 0.027% $Fe_2O_3$ and other minor impurities, including ignition loss.
[2] 99.5% $Al_2O_3$, 0.03% $Fe_2O_3$, 0.1% $Na_2O$, 0.08% $SiO_2Y$, 0.2+% ignition loss.
[3] 56.21% $B_2O_3$.
[4] Substantially pure $TiO_2$.

Glass bodies were formed from the melt and had an amber color. The glasses were then thermally crystallized by rapidly heating them to 1300° F. in a furnace, holding at that temperature for two hours, then increasing the temperature at the rate of 4°–5° F. per minute to 1500° F. and holding at 1500° F. for 1 hour. The bodies were then cooled at the rate of about 5° F. per minute. From X-ray diffraction analyses and from the low expansions it was determined that the transparent bodies were substantially crystallized and the predominant crystalline phase was beta-eucryptite crystals or betaeucryptite-like crystals. The resulting ceramics had coefficients of expansion of $0.7 \times 10^{-7}$ (0°–300° C.).

Other glass bodies of the same composition were subjected to another heat treatment by rapidly increasing their temperatures to 1300° F. and holding them there for 2 hours before gradually increasing their temperature at the rate of 4°–5° F. per minute to 2000° F., then holding them at this temperature for an additional one hour period, and then slowly cooling. Opaque ceramic bodies were formed having a lineal coefficient of thermal expansion of $13.1 \times 10^{-7}$ over the range of zero to 300° C.

Turning to FIG. 2, a schematic view of a transversely pumped laser is depicted including a solid state lasing material 10, a pumping source 13 and an optical resonant cavity comprised of totally reflective 14 and partially reflective 11 surfaces.

The incumbent light from source 13 passes through an optical lens 12 that focuses the beam 15. The beam then excites the material 10 so as to emit coherent radiation 16 which resonants between the totally reflective surface 14 and the partially reflective surface 11. The beam transmitted through surface 11 is tuned by tuning element 18. Any conventional tuning method may be used to adjust the wavelength of the beam 17. Suitable tuning elements include a prism, optical grating, birefringent filter, multilayer dielectric coated filter, or a lens having a longitudinal chromatic aberration. Because the Stokes shift of the materials suitable for this invention is relatively large, the tuning range is also relatively large.

If necessary to attain the desired operating temperature, laser medium 10 may be cooled. This may be done with air, water, or a cryogenic liquid and optionally may be preheated by conventional means to achieve better temperature control.

Optionally, the laser may include means for Q-switching. These means may comprise a saturable dye absorber, an acousto-optic Q-switch, or a polarizer and a Pockels cell placed in the beam path. Polarizer may be omitted particularly at low excitation power. The Q-switch "spoils" the Q of the cavity for an interval of time during which energy is stored. At the appropriate moment the Q-switch is turned to the high gain condition, and the stored energy in the medium is suddenly released in a "giant pulse" of very short duration. The laser may also be modelocked.

Those skilled in the art will recognize, or be able to ascertain using no more than routine experimentation, many equivalents to the specific embodiments of the invention described herein. Such equivalents are intended to be encompassed by the following claims.

I claim:

1. A laser comprising:
   a solid state lasing medium having a molecular emitting species such that an element of the molecular species has a closed shell configuration;
   optical means for exciting the states of said species; and
   an optical resonant cavity for oscillating coherent radiation emitted by the medium.

2. A laser as defined in claim 1 wherein said medium is a single crystal.

3. A laser as defined in claim 1 wherein said medium is further comprised of a glass.

4. A laser of claim 1 wherein said medium is further comprised of a glass-ceramic.

5. A laser as defined in claim 1 wherein said medium includes as the emitting species ions where the outer d shell has a closed shell configuration.

6. A laser as defined in claim 1 wherein said optical means for exciting is comprised of an excimer laser.

7. A laser as defined in claim 5 wherein said ions are selected from the group consisting of $Ti^{+4}$, $Zr^{+4}$, $Hf^{+4}$, $V^{+5}$, $Nb^{+5}$, $Ta^{+5}$, $Cr^{+6}$, $Mo^{+6}$, $W^{+6}$, and $Mn^{+7}$.

8. A laser as defined in claim 7 wherein the ions in said medium are bound with oxygen to form complexes therewith.

9. A laser as defined in claim 7 wherein the ions in said medium are bound with halogens to form complexes therewith.

10. A laser as defined in claim 7 wherein the ions in said medium are bound with mixtures of oxygens and halogens to form complexes therewith.

11. A laser as defined in claim 1 wherein said cavity is further comprised of means for tuning the coherent radiation.

12. A laser as defined in claim 1 wherein the optical means has a wavelength within the ultraviolet spectrum.

13. A laser as defined in claim 1 wherein said medium includes as said emitting species a mixture of ions each in a closed shell configuration.

14. A laser as defined in claim 13 wherein said mixture is comprised of ions selected from the group consisting of $Ti^{+4}$, $Zr^{+4}$, $Hf^{+4}$, $V^{+5}$, $Nb^{+5}$, $Ta^{+5}$, $Cr^{+6}$, $Mo^{+6}$, $W^{+6}$, and $Mn^{+7}$.

15. A solid state lasing medium including molecules having ions selected from the group consisting of $Ti^{+4}$, $Zr^{+4}$, $Hf^{+4}$, $V^{+5}$, $Nb^{+5}$, $Ta^{+5}$, $Cr^{+6}$, $Mo^{+6}$, $W^{+6}$, and $Mn^{+7}$ as an emitting species such that said molecules lase when optically excited in a cavity.

16. A solid state lasing medium as defined in claim 15 wherein said ions in said medium are bound with oxygen to form complexes therewith.

17. A solid state lasing medium as defined in claim 15 wherein said ions in said medium are bound with fluorine to form complexes therewith.

18. A solid state lasing medium as defined in claim 15 wherein the ions in said medium are bound with mixtures of oxygen and halogens to form complexes therewith.

19. A laser comprising:
   a solid state lasing medium having a molecular complex such that an element of said complex has a closed shell configuration;
   optical means for exciting the molecular states of said complex such that there is an intra-molecular transfer of an electron into the closed shell; and
   an optical resonant cavity for oscillating coherent radiation emitted by the medium.

20. A laser as defined in claim 19 wherein said element is selected from the group consisting of $Ti^{+4}$, $Zr^{+4}$, $Hf^{+4}$, $V^{+5}$, $Nb^{+5}$, $Ta^{+5}$, $Cr^{+6}$, $Mo^{+6}$, $W^{+6}$, and $Mn^{+7}$.

* * * * *